US008982449B2

(12) United States Patent
Rudin et al.

(10) Patent No.: US 8,982,449 B2
(45) Date of Patent: Mar. 17, 2015

(54) LIGHT MODULATION LAYER

(75) Inventors: John Christopher Rudin, Bristol (GB); Stephen Kitson, Alveston (GB); Adrian Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 13/695,132

(22) PCT Filed: Apr. 29, 2010

(86) PCT No.: PCT/US2010/032968
§ 371 (c)(1),
(2), (4) Date: Oct. 29, 2012

(87) PCT Pub. No.: WO2011/136776
PCT Pub. Date: Nov. 3, 2011

(65) Prior Publication Data
US 2013/0050808 A1 Feb. 28, 2013

(51) Int. Cl.
G02F 1/29 (2006.01)
G02F 1/03 (2006.01)
G02F 1/07 (2006.01)
G02F 1/153 (2006.01)
G02F 1/1347 (2006.01)
G02B 26/00 (2006.01)
(Continued)

(52) U.S. Cl.
CPC ............ G02F 1/1347 (2013.01); G02B 26/004 (2013.01); *G02F 1/133504* (2013.01); *G02F 1/13439* (2013.01); *G02F 1/13725* (2013.01); *G02F 2001/133357* (2013.01); *G02F 2001/133557* (2013.01); *G02F 2001/13478* (2013.01)

USPC ............................ 359/318; 359/246; 359/267

(58) Field of Classification Search
USPC ................. 359/242, 244–247, 252–254, 267, 359/315–318, 322
See application file for complete search history.

(56) References Cited

U.S. PATENT DOCUMENTS 5,115,305 A * 5/1992 Baur et al. .................... 348/751
6,181,398 B1 1/2001 Libsch et al.
(Continued)

FOREIGN PATENT DOCUMENTS

KR 10-2003-0013133 A 2/2003
KR 10-2005-0056128 A 6/2005
(Continued)

OTHER PUBLICATIONS

International Search Report and Written Opinion of the International Searching Authority, mailed Jan. 25, 2011, issued in related PCT Application No. PCT/US2010/032968.
(Continued)

*Primary Examiner* — Scott J Sugarman
*Assistant Examiner* — Brandi Thomas
(74) *Attorney, Agent, or Firm* — Hewlett-Packard Patent Department

(57) ABSTRACT

A light modulation layer of a full-color reflective display (112), the light modulation layer including an addressing layer (404); a mirror (406) positioned above the addressing layer (404), the mirror (406) configured to reflect light of a predetermined wavelength band; and an electro-optic layer (416) positioned above the mirror (406), the electro-optic layer (416) configured to absorb light of a predetermined wavelength band in response to a signal received from a switching device (204) of the addressing layer (404).

15 Claims, 6 Drawing Sheets

(51) Int. Cl.
  *G02F 1/1335* (2006.01)
  *G02F 1/1343* (2006.01)
  *G02F 1/137* (2006.01)
  *G02F 1/1333* (2006.01)

(56) References Cited

U.S. PATENT DOCUMENTS

| | | | |
|---|---|---|---|
| 6,560,001 B1 * | 5/2003 | Igasaki et al. | 359/245 |
| 6,618,102 B2 | 9/2003 | Harada et al. | |
| 7,311,404 B2 * | 12/2007 | Hori | 353/84 |
| 7,359,023 B2 * | 4/2008 | McKnight | 349/139 |
| 7,567,319 B2 | 7/2009 | Liu | |
| 7,567,370 B2 * | 7/2009 | Stellbrink et al. | 359/259 |
| 7,633,581 B2 | 12/2009 | Sikharulidze | |
| 2006/0066939 A1 | 3/2006 | Kimura | |
| 2009/0021822 A1 * | 1/2009 | Ikeda | 359/267 |
| 2010/0208169 A1 * | 8/2010 | Mun et al. | 349/65 |
| 2012/0176301 A1 * | 7/2012 | Gibson et al. | 345/88 |

FOREIGN PATENT DOCUMENTS

| | | |
|---|---|---|
| KR | 10-2007-0007023 A | 1/2007 |
| WO | WO-2007020576 A1 | 2/2007 |

OTHER PUBLICATIONS

F. Lemmi; W. Chung; S. Lin; P. M. Smith; T. Sasagawa; B. C. Drews; A. Hua; J. R. Stern; J. Y. Chen; "High-Performance TFTs Fabricated on Plastic Substrates"; http://ieeexplore.ieee.org/stamp/stamp.isp?tp=&isnumber=29035&arnumber=1308428>.

* cited by examiner

LIGHT MODULATION LAYER

BACKGROUND

A reflective display is one in which the displayed image is perceived by a viewer when ambient light is reflected from the display. This is opposed to emissive displays in which the display includes a light source of its own and emits backlight through the image to the viewer. Reflective displays operate by having a number of pixels within the display modulate the reflected light to a desired color. Thus, an image may be formed as different pixels may be configured to modulate reflected light differently at a given point in time. As reflective displays do not include their own light source, they consume less power than emissive displays. Reflective displays may also be ideal for outdoor use where emissive displays cannot produce sufficient brightness.

One method of forming a reflective display includes stacking light modulation layers, each light modulation layer configured to selectively absorb or reflect light of a different wavelength range within the visible spectrum. Typically, three layers are used and identified with cyan (to modulate red light), yellow (to modulate blue light) and magenta (to modulate green light). While such a reflective display may provide a wide color gamut, it may absorb more than an ideal amount of light as the light passes through the several modulation layers. Additionally, the absorption spectra of the layers may not be ideal. In order to produce a quality image of sufficient brightness and color gamut, it is beneficial to have a reflective display that minimizes the amount of absorption of the light which should be reflected.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1A:
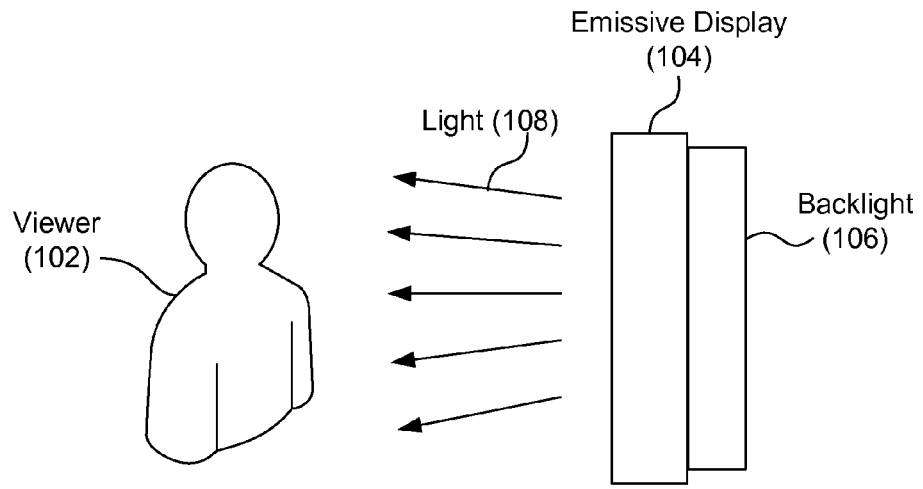
FIG. 1A is a diagram showing a side-view of an illustrative emissive display, according to one embodiment of principles described herein.

As mentioned above, a reflective display which includes a stack of light modulation layers may absorb more than an ideal amount of light as the light passes through the several modulation layers. In order to produce a quality image of sufficient brightness, it is beneficial to have a reflective display that absorbs as little of the light which should be reflected as possible. In light of this and other issues, the present specification relates to a reflective layer that reduces the amount of absorbed light, thus increasing the amount of light reflected by the display.

According to certain illustrative embodiments, a light modulation layer for a reflective display may include an addressing layer. This layer is used to address each pixel within the display. Positioned above the addressing layer, is a diffuse mirror. The diffuse mirror is configured to reflect light of a specified wavelength range. For example, a diffuse mirror may be configured to reflect blue light while letting red light and green light pass. Above the diffuse mirror may be an electro-optic layer. The electro-optic layer is sandwiched in between two transparent electrodes. The lower transparent electrode is connected to the addressing layer through a field via. The field via may run through the diffuse mirror. Signals from the addressing layer are routed through the field via to the lower transparent electrode. Based on the signals received by the transparent electrode from the addressing layer, the electro-optic layer is configured to either absorb or transmit light of selective wavelengths.

When a reflective display includes stacked light modulation layers embodying principles described herein, some wavelength ranges of light may be reflected by the top layers and need not pass through each light modulation layer and back to a viewer. For example, the electro-optic layer of the top light modulation layer may be configured to modulate the absorption of blue light with a yellow electro-optic layer. Additionally, the diffuse mirror of the top light modulation layer may be configured to reflect the modulated blue light. Thus, blue light does not need to pass through the lower levels where it may be absorbed by fixed broadband losses such as addressing lines and electrodes, and may also be incorrectly modulated by non-ideal absorption spectra of the lower level electro-optical layers. Such a configuration allows the blue light to experience less loss as it is modulated by the reflective display. Additionally, by placing the addressing layer beneath the diffuse mirror, some wavelengths of light may not need to pass through the addressing layer and thus will be subject to significantly less loss when being modulated by the reflective display.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "light" refers to electromagnetic radiation of a wavelength visible to the human eye. The wavelength of visible light generally ranges from 400 nanometers (nm) to 700 nm. A color adjective placed in front of the term light is generally used to specify a wavelength range of light which the human eye sees as a particular color. For example, the term "red light" may refer to electromagnetic radiation of a wavelength generally ranging from 600 nm to 700 nm.

Throughout this specification and in the appended claims, the term "electro-optic layer" is to be broadly interpreted as a layer which is configured to selectively reflect light of a specific wavelength range within the visible spectrum. Various types of electro-optic systems may be used by methods and systems embodying principles described herein including, but not limited to, dichroic guest host systems, electrophoretic systems, and electro-wetting systems.

Referring now to the figures, FIG. 1A is a diagram showing a side-view of an illustrative emissive display (104). According to certain illustrative embodiments, an emissive display (104) includes a backlight (106) configured to emit light (108) through the display (104) to a viewer (102). As mentioned above, an emissive display typically consumes more power than a reflective display.

Figure 1B:
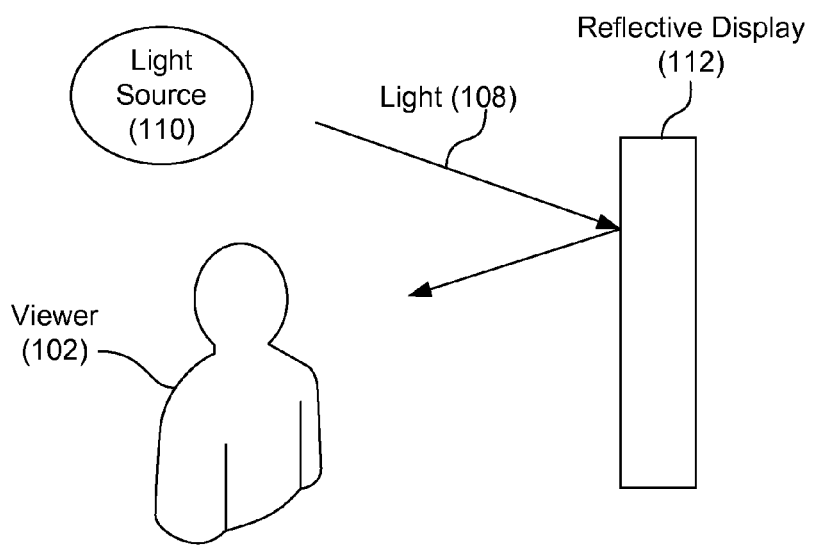
FIG. 1B is a diagram showing a side-view of an illustrative reflective display, according to one embodiment of principles described herein.

FIG. 1B is a diagram showing a side-view of an illustrative reflective display (112). According to certain illustrative embodiments, a reflective display (112) is configured to reflect ambient light (108) from an external light source (110). The external light source (110) may be any source of light common to home, work, or outdoor environments. Light incident on the reflective display (112) is modulated so that the display (112) reflects a desired color at desired coordinates on the display.

Figure 2:
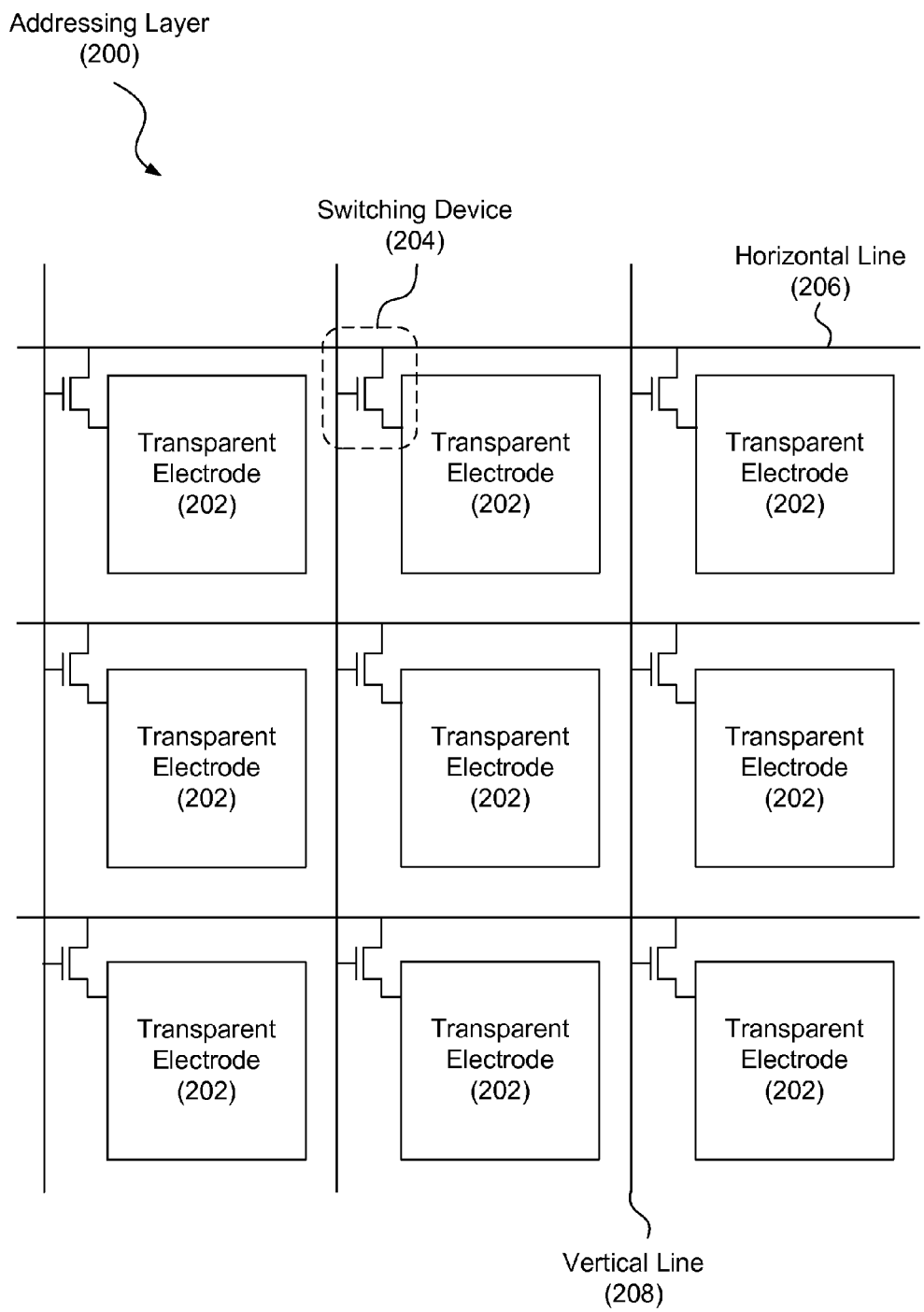
FIG. 2 is a diagram showing an illustrative addressing layer for a reflective display, according to one embodiment of principles described herein.

FIG. 2 is a diagram showing an illustrative addressing matrix for an addressing layer of a light modulation layer. An addressing layer may be used to address each pixel within a display. According to certain illustrative embodiments, an addressing layer (200) may include a number of horizontal lines (206) and a number of vertical lines (208). A switching device (204) such as a thin film transistor may be placed at each intersection between the horizontal lines (206) and vertical lines (208). Each switching device (204) may also be connected to a transparent electrode (202). Depending on an electric signal received by the transparent electrode (202) through the switching device (204), an electro-optic layer above the transparent electrode (202) may change absorption spectral properties to show different colors of light to a viewer. Examples of ways in which an electro-optic layer modulates light will be described below.

One type of switching device (204) which may be used is a transistor. One type of transistor which is typically used as a switching device is a Metal-Insulator-Semiconductor Field Effect Transistor (MISFET) device. A transistor typically includes three terminals; a gate, a drain, and a source. There are many configurations, however, a typical MISFET device may be either an N channel device or a P channel device. If the signal supplied to the gate of a P channel MISFET device is lower than a threshold voltage, then the transistor may be in an ON state, allowing electric current to pass between the drain and a source. If a transistor is in an OFF state, then electric current is prohibited from flowing between the source and the drain.

A Thin Film Transistor (TFT) (204) is a transistor in which the layers of semiconductor material and conductive material are deposited onto a substrate in thin films. Thus, the transistor may be relatively thin compared to other transistor manufacturing methods. The thin nature of TFT devices (204) makes them ideal for flat panel displays. To be used in a display, the substrate material onto which the TFT devices (204) are deposited is often glass or another transparent medium. This allows light to pass through the TFT (204) addressing matrix (200) and eventually to a viewer.

As mentioned above, a switching device (204) may be placed at each intersection of a horizontal line (206) and a vertical line (208). In some embodiments, the gate terminal of each switching device (204) may be connected to a vertical line (208). Similarly, the source terminal of each switching device may be connected to a horizontal line (206). If the switching devices are P channel devices, then a low signal received along the vertical line (206) may switch the transistors along that line into an ON state. If a transistor is in an ON state and receives a signal from a horizontal line (208), the signal may flow through the transistor to the transparent electrode (202). Thus, the electrical state of an individual transparent electrode (202) may be changed by signals received through the addressing matrix (200).

In some embodiments, a capacitive device may be used with each transistor. The capacitive device may hold the transparent electrode in its assigned state until the next refresh cycle of the display. Typical display devices include a refresh cycle in which the state of each pixel is refreshed at regular intervals. These regular intervals are typically faster than the human eye is able to detect.

A transparent electrode (202) is made of a material which is both electrically conductive and optically transparent. One example of a material which may be used as a transparent electrode is Indium Tin Oxide (ITO), another example is PolyEthyleneDiOxyThiophene PolyStyreneSulfonate (PEDOT:PSS). When used in a display device, the transparent electrode (202) may be placed above and below an electro-optic layer. By changing the voltages at one or both of the transparent electrodes, the optical properties of the electro-optic layer may be changed so as to allow light of selective wavelengths to be absorbed or transmitted. One common technology which may be used by an electro-optic layer is dichroic dye Guest Host Liquid Crystal (GHLC) technology.

As mentioned above, one way to form a reflective display is to stack a number of light modulation and reflecting layers, each light modulation layer absorbing or transmitting, and each reflecting layer reflecting light of selective wavelengths. Such a configuration may eliminate the need for certain wavelength ranges of the visible spectrum from passing through all layers to a broadband, or selective wavelength back mirror and subsequently pass through those layers again and eventually to a viewer.

Figure 3:
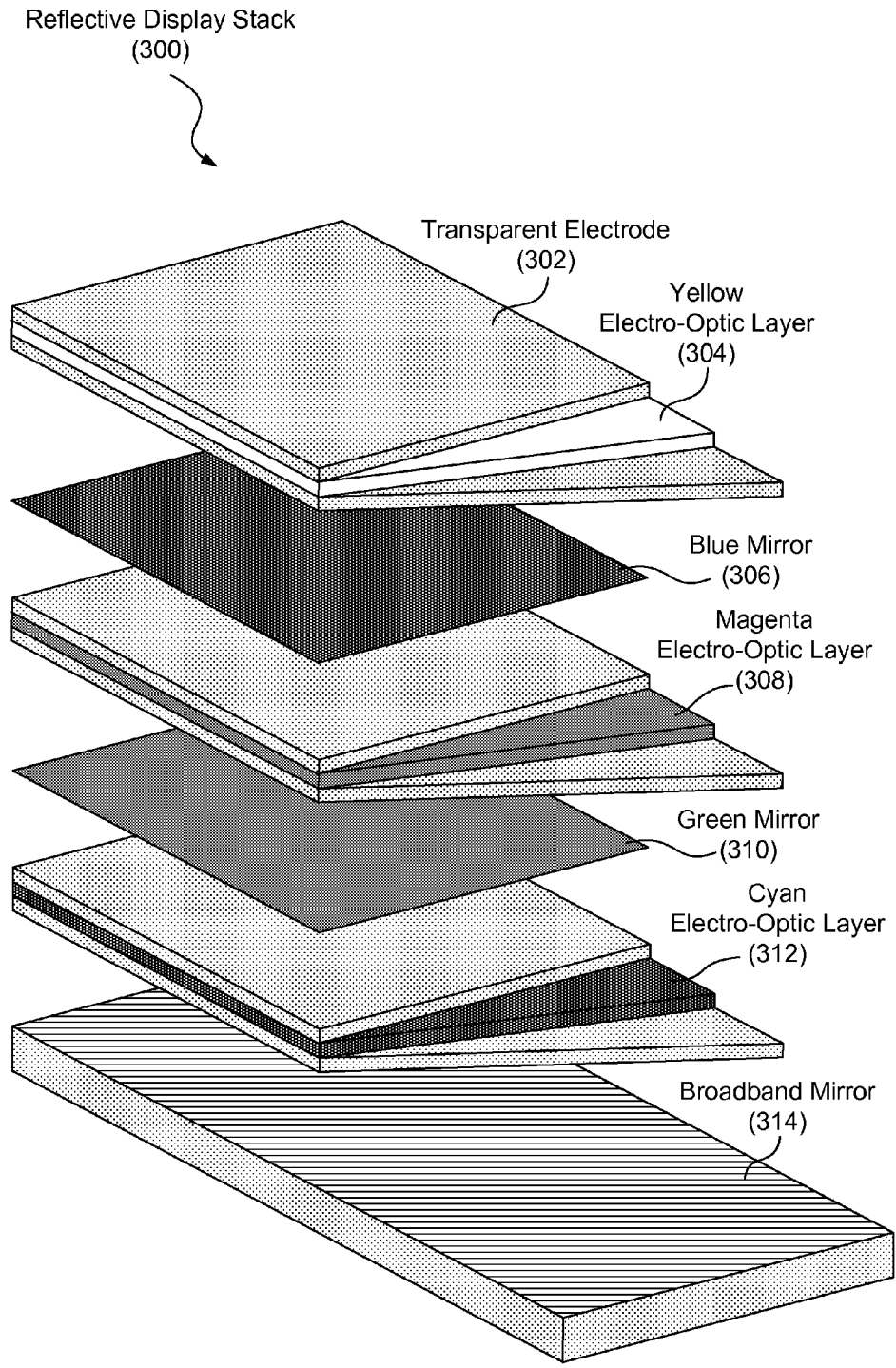
FIG. 3 is a diagram showing an illustrative reflective display stack, according to one embodiment of principles described herein.

FIG. 3 is a diagram showing an illustrative reflective display stack (300). According to certain illustrative embodiments, the top layer may include a yellow electro-optic layer (304) sandwiched between two transparent electrodes (302). A blue mirror (306) may be placed between the top layer and the middle layer. The next layer down may include a magenta electro-optic layer (308) sandwiched between two transparent electrodes (302). Likewise, a green mirror (310) may be placed between the middle layer and the bottom layer. The bottom layer may include a cyan electro-optic layer (312) sandwiched between two transparent electrodes. The bottom of the reflective layer stack may include a mirror configured to reflect at least red light but could also reflect other colors which may not have been properly reflected by mirrors higher up in the stack.

The yellow electro-optic layer (304) may be configured to either absorb or transmit blue light based on the electrical state of the transparent electrodes (302). As mentioned above, the state of the transparent electrodes may depend on signals received by an addressing layer. For example, the yellow electro-optic layer (304) may be configured to transmit light of all visible wavelengths by default. If, however, it is desired that the particular pixel be modulated to absorb blue light, the state of the electro-optic layer may be altered so that light within the blue color region is absorbed while light having a wavelength from the rest of the visible spectrum is still transmitted.

A blue mirror (306) may be placed underneath the yellow electro-optic layer (304). The blue mirror (306) may be configured to reflect blue light while allowing red and green light to pass. The blue light has already been modulated by the yellow electro-optic layer (304) and does not need to pass through any more layers. Thus, the final brightness of the blue light as perceived by the viewer is greater because the blue light did not go through the lower layers, causing that light to lose brightness through each layer. Additionally the spectrum of the blue light is not modulated by out-of-band absorption in the other electro-optical modulation layers. The blue mirror (306) may also be configured to reflect light diffusely.

A magenta electro-optic layer (308) may be placed beneath the blue mirror (306). The magenta electro-optic layer (308) may be configured to either absorb or transmit green light based on the electrical state of its surrounding transparent electrodes (302). The state of the transparent electrodes may depend on signals received by an addressing layer. For example, the magenta electro-optic layer (308) may be configured to transmit light of all visible wavelengths by default. If, however, it is desired that the particular pixel be modulated to absorb green light, the state of the magenta electro-optic layer (308) may be altered so that light within the green color region is absorbed while light having a wavelength from the rest of the visible spectrum is still transmitted.

A green mirror (310) may be placed underneath the magenta electro-optic layer (308). The green mirror (310) may be configured to reflect green light while allowing red light to pass. The green mirror (310) may also reflect blue light if the blue light was not properly reflected by the blue mirror (306). The green light has already been modulated by the magenta electro-optic layer (308) and does not need to pass through any more layers. Thus, the final brightness of the green light as perceived by the viewer may be greater as the green light did not go through the lowest layer. The green mirror (310) may also be configured to reflect light diffusely.

A cyan electro-optic layer (312) may be placed beneath the green mirror (310). The cyan electro-optic layer (312) may be configured to either absorb or transmit red light based on the electrical state of its surrounding transparent electrodes (302). The state of the transparent electrodes may depend on signals received by an addressing layer. For example, the cyan electro-optic layer (308) may be configured to transmit light of all visible wavelengths by default. If, however, it is desired that the particular pixel be modulated to absorb red light, the state of the electro-optic layer may be altered so that light within the red color region is absorbed.

A broadband mirror (314) may be placed underneath the cyan electro-optic layer (312). The broadband mirror (314) may be configured to reflect light of all visible wavelengths. Any light that has not been reflected or absorbed may be reflected back out of the reflective display stack (300). Alternatively, this mirror may only need to reflect light in at least the red color region and be configured to reflect only in that wavelength band. The red or broadband mirror may also be configured to reflect light diffusely.

Each pixel within a reflective display may use the reflective display stack (300) principles illustrated in FIG. 3. Each pixel may be addressed using an addressing layer such as a TFT addressing matrix. However, doing so requires an addressing layer for each electro-optic layer. Thus, light must pass through an additional layer of material for each electro-optical layer. Consequently, the present specification discloses a configuration for such a reflective display stack that minimizes the addressing layers which the incident light may have to pass through.

Figure 4:
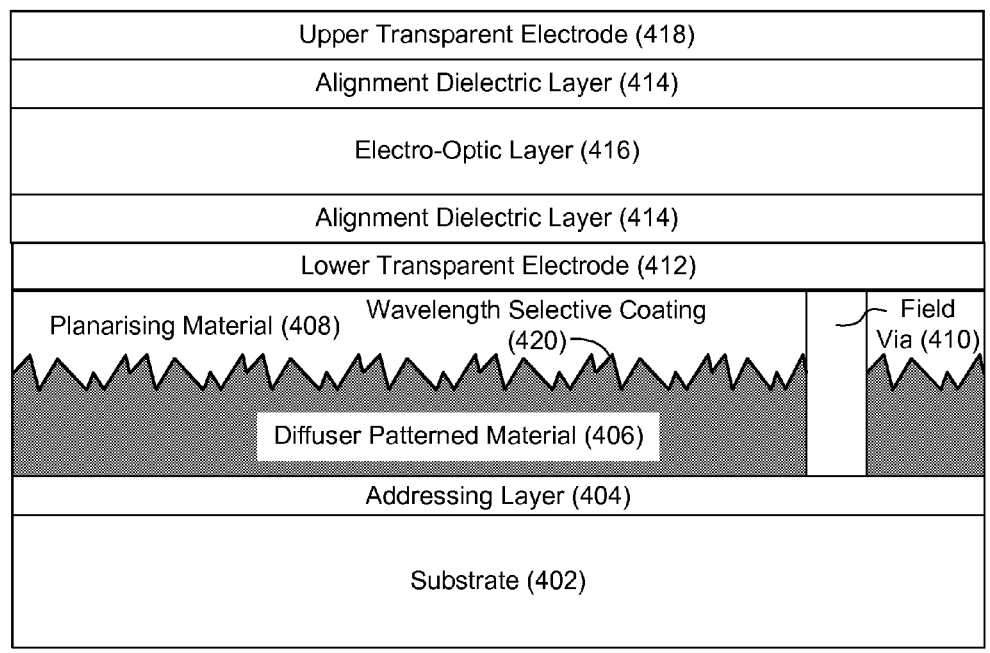
FIG. 4 is a diagram showing an illustrative light modulation layer for a reflective display, according to one embodiment of principles described herein.

FIG. 4 is a diagram showing an illustrative light modulation layer (400) for a reflective display. According to certain illustrative embodiments, a light modulation layer (400) may include an addressing layer (404) and a diffuse layer including a diffuser patterned material (406), a planarising dielectric (408), and a field via (410). The light modulation layer (400) may also include an electro-optic layer (416) sandwiched between alignment dielectric layers (414) and transparent electrodes (412, 418).

The addressing layer (404) may include the horizontal lines, vertical lines, and switching devices such as TFT devices as illustrated in FIG. 2. The addressing layer (404) may be deposited onto a substrate (402). The substrate (402) may be a transparent material such as glass, thus allowing light to pass through to other layers in the case that the light modulation layer (400) is not the bottom layer in a stack. Alternatively, the transparent material may be a plastic film to reduce the thickness of the layer.

The addressing layer (404) may utilize either active matrix addressing or passive matrix addressing. The signals received by each switching device within the addressing matrix may connect to a transparent electrode (412). The signals sent to the transparent electrode (412) may be used to modulate the electro-optic layer (416).

The diffuse mirror, which may include the diffuser patterned material (406), the wavelength selective coating (420) and the planarising material (408) may be placed between the transparent electrode (412) and the addressing layer (404). In some embodiments, the diffuser patterned material (406) may also act as a wavelength selective material configured to reflect light of a particular wavelength while transmitting light of other wavelengths.

In some embodiments, the diffuse mirror may include a diffuser patterned dielectric material (406) that is itself not wavelength selective. However, a wavelength selective coating (420) may be placed on top of the diffuser patterned material (406). In some embodiments, the diffuse mirror may be integrated with the electro-optic layer. For example, if a specular mirror is used with the wavelength selective mirror, then the electro-optic layer may be configured to perform the diffusing function.

A diffuse mirror differs from a specular mirror in that a specular mirror reflects light at the same absolute angle at which it was received. A diffuse mirror reflects light over many angles. Thus a diffuse mirror may reflect incident light in many directions, allowing a viewer to see the reflected image at wider viewer angles. Diffuse mirrors are typically formed by creating a rough surface and coating with a wavelength selective layer such as a multilayer interference filter, or Bragg mirror. In order to provide a smooth surface for the layer deposited on top of the diffuse mirror, a planarising dielectric (408) material may be used to smooth out the surface. The planarising dielectric (408) may be a standard transparent dielectric material.

The addressing layer (404) may connect to the lower transparent electrode through a field via (410). The field via (410) may be formed through the dielectric diffuse mirror layer, thus providing an electrical path between a switching device of the addressing layer (404) and the lower transparent electrode (412). The field via (410) may be made of any standard electrically conductive material.

As mentioned above, the electro-optic layer (416) may be used to selectively absorb or reflect light of particular wavelengths. There are several methods for performing such a function. As mentioned above, one example of such a method is the use of a dyed guest host liquid crystal system. Based on the voltage applied to the lower electrode (412), the dyed liquid crystal may change its alignment to either absorb or transmit light in a particular wavelength band. For example, the default state of the electro-optic layer (416) may be to let light of all visible wavelengths pass. When a voltage is applied to the lower transparent electrode (412), the liquid crystal structure within the electro-optic (416) layer may be reoriented so that the electro-optic (416) layer absorbs blue light, while not affecting light of other wavelengths.

Alternatively, an electro-optic layer may use an electrophoretic system to either absorb or transmit light of a particular wavelength. The use of electrophoretics involves charged particles suspended within a fluid. Based on the electric field created by a nearby transparent electrode the charged particles may be moved to different positions within the fluid. For example, the charged particles may be gathered and moved out of view behind a reflecting element when transmitting light. When it is desired to absorb light, the electric field may change so that the charged particles are moved from behind a reflecting element and into view. The charged particles may also be dyed or be pigmented so as to absorb light of a particular wavelength range.

In some embodiments, the electro-optic layer may use electro-wetting. Electro-wetting is a process whereby the wetting properties of a hydrophobic surface are manipulated by an applied electric field.

In some embodiments, the electro-optic layer may be surrounded by alignment layers (414). Such layers may insulate the electro-optic layers from the transparent electrodes (412, 418) above and below the electro-optic layer (416) and serve to provide the correct alignment and surface energy boundary conditions for the electro-optical mode. The upper transparent electrode (418) above the electro-optic layer (416) may be held at a constant bias voltage. This bias voltage may be set to the proper value in order to have the electro-optic layer function properly.

In some embodiments, an optical compensation film may be placed between the diffuse mirror and the electro-optic layer. For example, a quarter wave plate may be used to alter the polarization of light before it passes through the electro-optic layer. This may be beneficial as some electro-optic layers may work better if the light is of a particular polarization.

Figure 5:
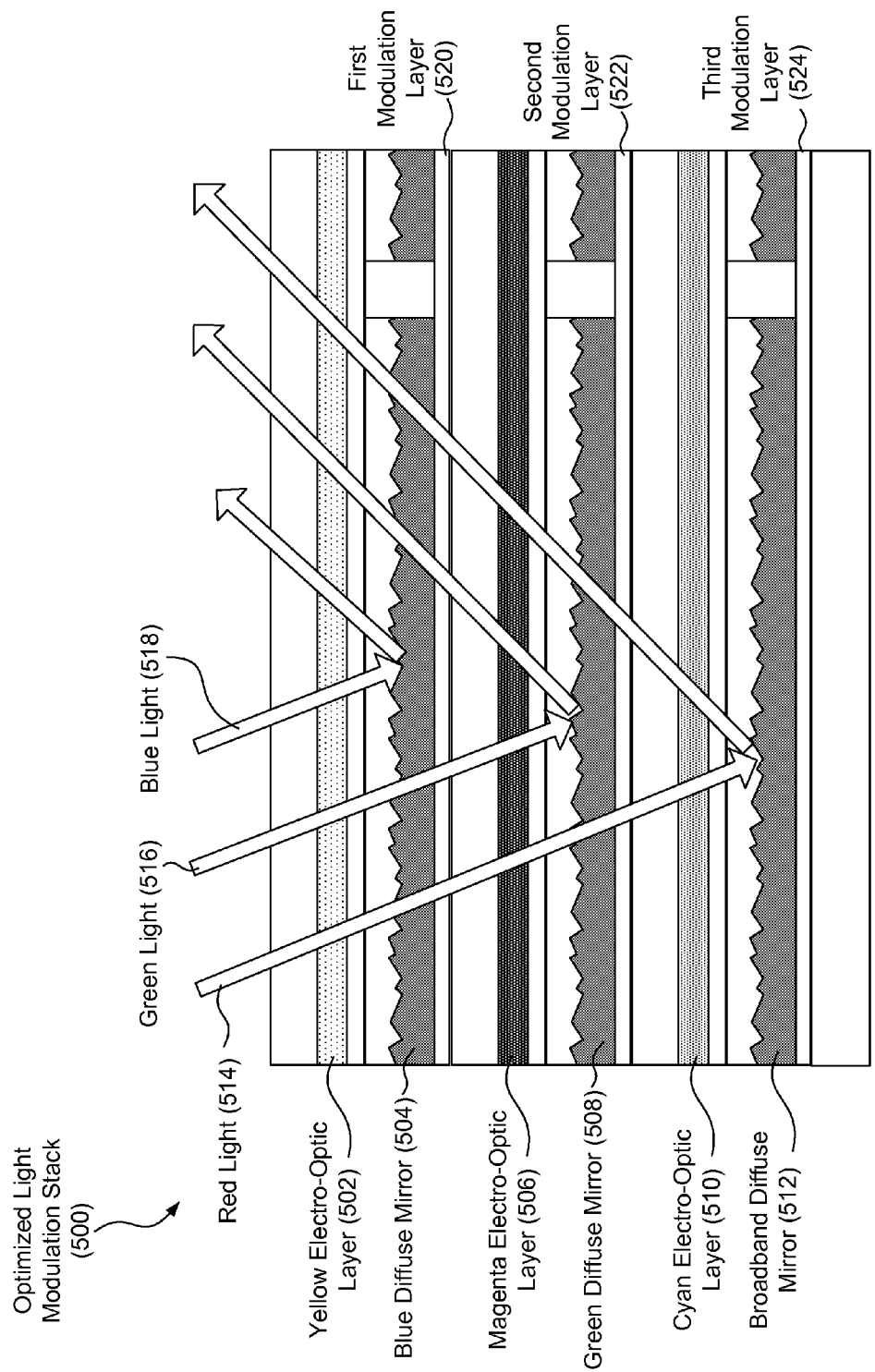
FIG. 5 is a diagram showing an illustrative optimized stack of light modulation layers for a reflective display, according to one embodiment of principles described herein.

FIG. 5 is a diagram showing an illustrative optimized light modulation stack (500) for a reflective display. According to certain illustrative embodiments, the light modulation stack (500) may include three light modulations layers. Each light modulation layer may be configured to selectively absorb or reflect light within a different wavelength range. Whether a modulation layer absorbs light of a particular wavelength range or not may depend on a signal received from an addressing layer.

In one example of operation, white ambient light is incident upon the reflective color display. White light includes red light (514), green light (516), and blue light (518). The first modulation layer (520) may include a yellow electro-optic layer (502) and a blue diffuse mirror (504). Thus, when white light is incident upon the first modulation layer (520), an amount of blue light (518) may be absorbed by the yellow electro-optic layer (502). The amount of blue light (518) absorbed by the yellow electro-optic layer (502) may depend on the signal received from the addressing layer of the first light modulation layer (520). Thus, the blue light (518) is correctly modulated and does not need to pass through the addressing layer or any subsequent modulation layers (522, 524). The blue diffuse mirror (504) may be used to reflect the blue light (518) while allowing the red light (514) and green light (516) to pass. The blue light (518) never travels through the addressing layer as it is located beneath the blue diffuse mirror (504).

In some embodiments, the addressing layer of the first modulation layer (520) may be of a lower density than the lower layers. This means that the blue color within the reflective display may be of a lower resolution than the red and green color. It has been noted that a reduced resolution of the blue color does not significantly affect the overall image quality of a color display as viewed by the human eye.

After passing the first modulation layer (520), the red light (514) and the green light (516) may pass through the second modulation layer (522). The second modulation layer (522) may include a magenta electro-optic layer (506) and a green diffuse mirror (508). Thus, when the red light (514) and the green light (516) are incident upon the second modulation layer (522), an amount of green light (516) may be absorbed by the magenta electro-optic layer (506). The amount of green light absorbed by the magenta electro-optic layer (506) may depend on the signal received from the addressing layer of the second light modulation layer (522). Thus, the green light (516) is correctly modulated and does not need to pass through the addressing layer or the third modulation layer (524). The green diffuse mirror (508) may be used to reflect the green light (516) while allowing the red light (514) to pass. The green light (516) may then travel back through the first modulation layer (520) and out of the reflective display. The green light (516) may not travel through the addressing layer of the second modulation layer (522) as the addressing layer is located beneath the green diffuse mirror (508).

After passing the first modulation layer (520) and the second modulation layer (522), the red light (514) may pass through the third modulation layer (524). The third modulation layer (524) may include a cyan electro-optic layer (510) and a broadband diffuse mirror (512). Thus, when the red light (514) is incident upon the third modulation layer (524), an amount of red light may be absorbed by the cyan electro-optic layer (510). The amount of red light absorbed by the cyan electro-optic layer (510) may depend on the signal received from the addressing layer of the third light modulation layer (524). Thus, the red light (514) is correctly modulated and does not need to pass through any more layers. The broadband or red diffuse mirror (512) may be used to reflect the red light (516) as well as any other wavelength of light that may have passed through the upper modulation layers. The red light (514) may then travel back through the first modulation layer (520) and the second modulation layer (522) and out of the reflective display. The red light (514) may not travel through the addressing layer of the third modulation layer (524) as the addressing layer is located beneath the broadband or red diffuse mirror (512).

The rays indicating red light (514), green light (516), and blue light (518) are shown being specularly reflected in FIG. 5 to illustrate how deep into the light modulation stack (500) each wavelength band of light may pass. However, due to the diffuse properties of the layers, the light would be diffusely reflected.

Figure 6:
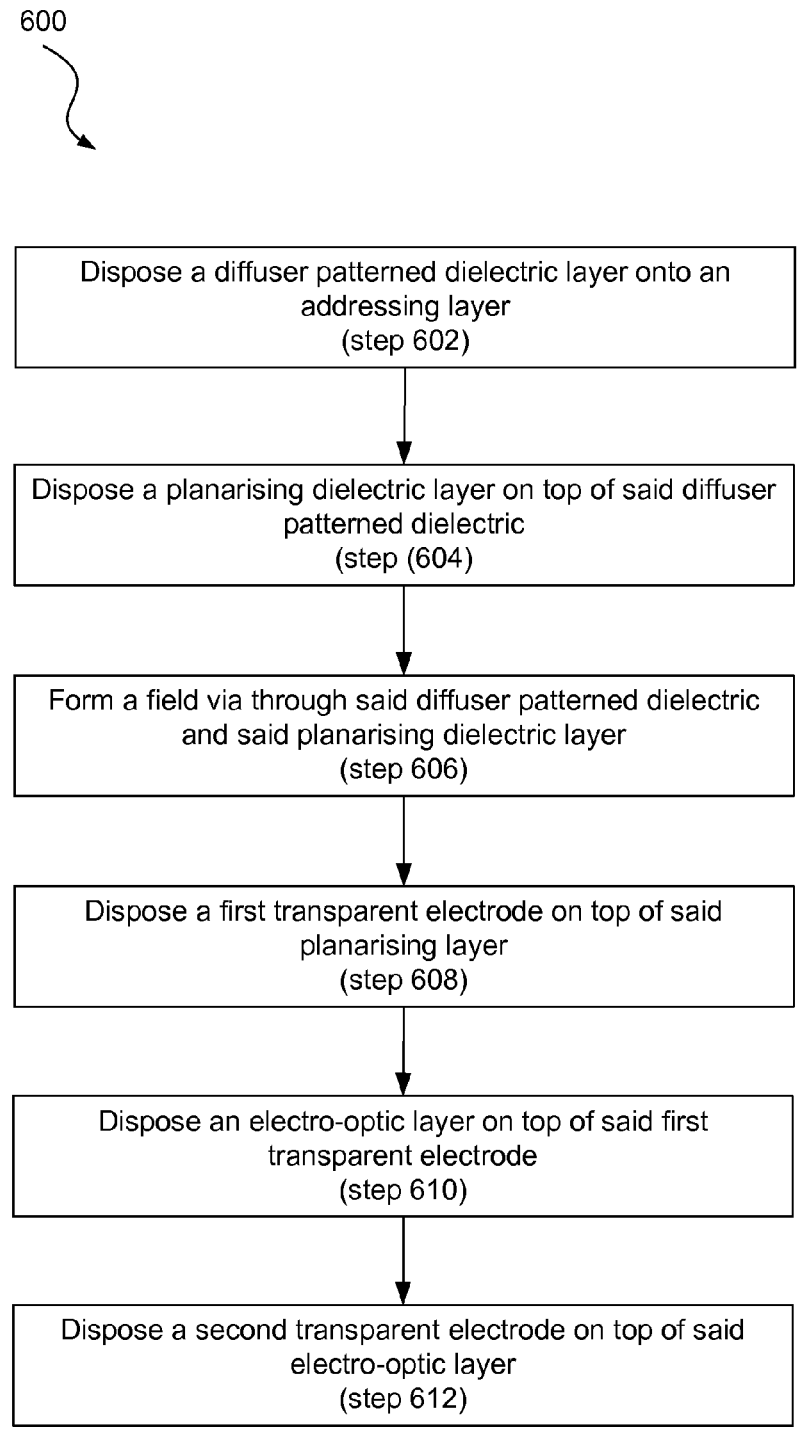
FIG. 6 is a flow chart showing an illustrative method for reflecting light with a stack of light modulation layers, according to one embodiment of principles described herein.

FIG. 6 is a flow chart showing an illustrative method for reflecting light with a stack of light modulation layers. According to certain illustrative embodiments, the method may include disposing (step 602) a diffuser patterned material layer onto an addressing layer; disposing (step 604) a planarising dielectric layer on top of the diffuser patterned material; forming (step 606) a field via through the diffuser patterned material and the planarising dielectric layer; disposing (step 608) a first transparent electrode on top of the planarising layer; disposing (step 610) an electro-optic layer on top of the first transparent electrode; and disposing (step 612) a second transparent electrode on top of the electro-optic layer.

In sum, when a reflective display includes stacked light modulation layers embodying principles described herein, some wavelength ranges of light may be reflected by the top layers and not need to pass through each light modulation layer and back to a viewer. For example, the electro-optic layer of the top light modulation layer may be configured to absorb blue light. Additionally, the diffuse mirror of the top light modulation layer may be configured to reflect blue light. Thus, blue light does not need to pass through the lower levels. Such a configuration allows the blue light to experience less loss and erroneous modulation as it is modulated by the reflective display. Additionally, by placing the addressing layer beneath the diffuse mirror, some wavelengths of light may not need to pass through the addressing layer and thus will be subject to less loss when being modulated by the reflective display.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A light modulation layer of a full-color reflective display, said light modulation layer comprising:
   an addressing layer;
   a mirror positioned above said addressing layer, said mirror configured to reflect light of a predetermined wavelength band; and
   an electro-optic layer positioned above said mirror, said electro-optic layer configured to absorb light of a predetermined wavelength band in response to a signal received from a switching device of said addressing layer, wherein said full-color reflective display receives incident light from a light source only at a first surface and outputs reflected light, as a viewable image, only from said first surface, wherein said incident light is ambient light.

2. The light modulation layer of claim 1, in which said mirror is one of: a diffuse mirror or a specular mirror.

3. The light modulation layer of claim 1, further comprising a field via through said mirror connecting said switching device of said addressing layer to a transparent electrode positioned above said mirror.

4. The light modulation layer of claim 1, in which said mirror is configured to reflect light of a wavelength within at least one of: a blue color region, a green color region, or a red color region.

5. The light modulation layer of claim 1, in which said electro-optic layer is configured to absorb light of a wavelength within at least one of: a blue color region, a green color region, or a red color region.

6. The light modulation layer of claim 1, further comprising a planarising dielectric disposed between said mirror and a transparent electrode.

7. The light modulation layer of claim 1, in which said electro-optic layer comprises one of: a dyed guest host liquid crystal system, an electrophoretic system, or an electrowetting system.

8. A full-color reflective display comprising:
   three light modulation layers, each light modulation layer comprising:
   an addressing layer;
   a mirror positioned above said addressing layer, said mirror configured to reflect light of a predetermined wavelength band; and
   an electro-optic layer positioned above said mirror, said electro-optic layer configured to absorb light of a predetermined wavelength band in response to a signal received from a switching device of said addressing layer, wherein said full-color reflective display receives incident light from a light source only at a first surface and outputs reflected light, as a viewable image, only from said first surface, wherein said incident light is ambient light.

9. The display of claim 8, in which said mirror is one of: a diffuse mirror or a specular mirror.

10. The display of claim 8, in which said mirror of each of said three light modulation layers is configured to reflect light of different wavelength bands.

11. The display of claim 8, in which said electro-optic layer of each of said three light modulation layers is configured to absorb light of different wavelength bands.

12. The display of claim 8, in which said addressing layer of a top light modulation layer of said three light modulation layers is of a reduced resolution.

13. The display of claim 8, in which said electro-optic layer comprises one of: a dyed guest host liquid crystal system, an electrophoretic system, or an electrowetting system.

14. A method of forming a light modulation layer of a full-color reflective display, said method comprising
   positioning a mirror on an addressing layer, said mirror configured to reflect light of a predetermined wavelength band; and
   positioning an electro-optic layer on said mirror, said electro-optic layer configured to absorb light of a predetermined wavelength band in response to a signal received from a switching device of said addressing layer, wherein said full-color reflective display receives incident light from a light source only at a first surface and outputs reflected light, as a viewable image, only from said first surface, wherein said incident light is ambient light.

15. The method of claim 14, further comprising:
   disposing a diffuser patterned material layer onto said addressing layer;
   disposing a planarising dielectric layer on top of said diffuser patterned material;
   forming a field via through said diffuser patterned material and said planarising dielectric layer;
   disposing a first transparent electrode on said planarising layer;
   disposing an electro-optic layer on said first transparent electrode; and
   disposing a second transparent electrode on said electro-optic layer.

* * * * *